(12) United States Patent
Gangadhar

(10) Patent No.: US 7,484,121 B2
(45) Date of Patent: Jan. 27, 2009

(54) SELF-AWARE AND SELF-HEALING COMPUTING SYSTEM

(75) Inventor: Deepak K. Gangadhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 11/215,760

(22) Filed: Aug. 30, 2005

(65) Prior Publication Data

US 2007/0053252 A1   Mar. 8, 2007

(51) Int. Cl.
*G06F 11/00* (2006.01)
(52) U.S. Cl. .......................... 714/26; 714/47
(58) Field of Classification Search ................ 714/26, 714/47
See application file for complete search history.

(56) References Cited

U.S. PATENT DOCUMENTS

| | | | |
|---|---|---|---|
| 5,661,668 A * | 8/1997 | Yemini et al. ............... | 702/186 |
| 6,006,016 A * | 12/1999 | Faigon et al. ................. | 714/48 |
| 7,225,137 B1 * | 5/2007 | Barritz .......................... | 705/1 |
| 7,260,743 B2 * | 8/2007 | Fellenstein et al. ............ | 714/26 |
| 7,318,178 B2 * | 1/2008 | Steinberg et al. ............. | 714/47 |
| 7,328,376 B2 * | 2/2008 | McGuire et al. .............. | 714/48 |
| 2003/0126501 A1 * | 7/2003 | Musman ...................... | 714/26 |
| 2005/0188285 A1 * | 8/2005 | Fellenstein et al. ............ | 714/54 |
| 2006/0069957 A1 * | 3/2006 | Ganesh et al. ................ | 714/26 |
| 2007/0150772 A1 * | 6/2007 | Berenbach et al. ............ | 714/25 |

OTHER PUBLICATIONS

Gerald Tesauro et al., A multi-agent systems approach to autonomic computing, Proceedings of AAMAS, Jul. 19-23, 2004, New York, NY.
Nathan Combs et al., Adaptive mirroring of system of systems architectures, Proceedings of WOSS, Nov. 18-19, 2002, Charleston, SC.
A Lee et al., Emotional attributes in autonomic computing systems, Proceedings, 14th Int'l Workshop on Database & Expert Systems Appl'ns, 2003, Los Alamitos,CA (Abstract Only).
J. Hu et al., Multi-agent system based autonomic computing environment, Proceedings of 2004 ICMLC, 2004, Piscataway, NJ (Abstract Only).

(Continued)

*Primary Examiner*—Joshua A Lohn
(74) *Attorney, Agent, or Firm*—Schmeiser, Olsen & Watts; William H. Steinberg

(57) ABSTRACT

Autonomic computing systems are self-aware and self-healing. Microstates of components of a system are organized into macrostates, and the macrostates are organized into meta-dynamic states (MDS's). When the system is perturbed, it is determined whether the system enters a given undesirable MDS. Where the system will enter an undesirable MDS, a microstate/MDS graph (MMG) is constructed depicting which meta-dynamic states the system enters when its microstates are changed. A self-heal graph (SHG) is constructed from the MMG. The undesirable MDS is at the center of, and a desired MDS is at the periphery of, the SHG. The SHG has paths from the undesirable MDS to the desired MDS, each path having an associated cost incurred if the system moves along the path. An optimal path is selected from these paths that have the lowest associated costs. The system moved on the selected optimal path to reach the desired MDS.

3 Claims, 12 Drawing Sheets

OTHER PUBLICATIONS

J Hillman et al., Meta-adaptation in autonomic systems, 10th IEEE Int'l Workshop on Future Trends . . . , 2004, Los Alamitos, CA (Abstract Only).

R. Sterritt et al., Personal autonomic computing self-healing tool, Proceedings of 11th IEEE Int'l Conf & Workshop on Eng'ring . . . , 2004, Los Alamitos, CA (Abstract Only).

* cited by examiner

US 7,484,121 B2

SELF-AWARE AND SELF-HEALING COMPUTING SYSTEM

FIELD OF THE INVENTION

The present invention relates generally to computing systems, such as autonomic computing systems, and more particularly to such computing systems that are self-aware and self-healing.

BACKGROUND OF THE INVENTION

Computing systems have become increasingly complex, yet are increasingly relied upon to perform mission-critical functions. As a result, when a computing system fails, significant money can be lost until the computing system is restored. However, complex and sophisticated systems can take a long time to restore, even when a large number of programmers and developers are dispatched to restore them. Therefore, there is a need within the prior art for computing systems that are self-aware, such that they can detect when they have failed or are about to fail, and for computing systems that are self-healing, such that they can restore themselves.

SUMMARY OF THE INVENTION

The present invention relates to self-aware and self-healing autonomic computing systems. A method of the invention organizes microstates of components of a computing system into macrostates of the computing system, and organizes the macrostates into meta-dynamic states (MDS's) of the computing system. The computing system is capable of being in different macrostates when in a given MDS, but remains dynamically invariant when in the given MDS regardless of which macrostate the computing system is in. The MDS's are organized into desirable MDS's, undesirable MDS's, and transient MDS's. Desirable and undesirable MDS's are stable, whereas transient MDS's are unstable, and are the transient states in which the computing system enters on the way to a desirable or an undesirable MDS.

In response to the computing system being perturbed, the method determines whether the computing system will enter or has entered a given undesirable MDS. If the computing system will enter or has entered a desirable MDS, nothing may be done in one embodiment of the invention, since the computing system itself will stabilize to the desirable MDS, if it has not already done so already. However, if the computing system will enter or has entered an undesirable MDS, then the method constructs a microstate/MDS graph (MMG) that depicts which meta-dynamic states the computing system enters when microstates of the computing system are changed. The microstates are changed according to a number of parameters, including the maximum number of components that may be forced to have a microstate change at any given time, the cost associated with each microstate change, and the time limit for how long movement of the computing system to a desired MDS is to take.

Next, the method constructs a self-heal graph (SHG) from the MMG. The given undesirable MDS is at the center of the SHG, and the nodes at the periphery of the SHG are part of the desired MDS. The SHG thus has paths from the given undesirable MDS to the desired MDS, where each path has an associated cost that is incurred for the computing system to move along the path. The method selects an optimal path from the paths leading from the given undesirable MDS to the desired MDS, which have the lowest associated costs. The method finally causes the computing system to move on the optimal path selected so that the computing system reaches the desired MDS. The method may be implemented as a computer program stored on a computer-readable medium of an article of manufacture. The computer-readable medium may be a recordable data storage medium, a modulated carrier signal, or another type of medium.

A computing system of the invention includes two components. The first component monitors a target computing system, which may be the same or a different computing system than the computing system having the two components, to detect perturbations of the computing system that result in movement of the target computing system to new MDS's. The first component further determines whether the new MDS's are undesirable or desirable. The second component causes the target computing system to move along paths to desired MDS's, where the first component has determined that the new MDS's are undesirable. The target computing system itself includes a number of components, where each component has a number of microstates organized into a number of macrostates, and where the macrostates are organized into MDS's.

Embodiments of the invention provide for advantages over the prior art. An autonomic computing system of the invention is self-aware, in that it is able to determine whether an MDS into which it has been perturbed is desirable or undesirable. The autonomic computing system is further self-healing, because if it determines that the MDS into which it is perturbed is undesirable, the computing system can perform a corrective action. Specifically, the computing system determines an optimal path from the undesirable MDS to a desired, desirable MDS, and causes itself to move along this path.

Embodiments of the invention impart the homeostatic behavior of the human autonomic nervous system (ANS), which allows the human body to achieve self-awareness and self-healing, into computing systems, making them autonomic in turn. That is, embodiments of the invention artificially simulate the homeostasis found in the human body, to achieve autonomic computing systems. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

Figure 1A:
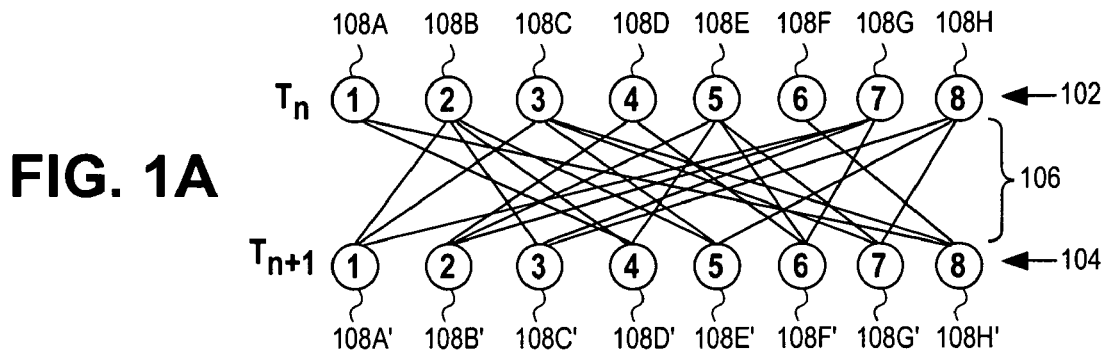
FIGS. 1A, 1B, 1C, and 1D are diagrams of an example random Boolean network (RBN) architecture, and depicting how the dynamics of an RBN are defined as a set of rules, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The detailed description is organized as follows. First, background on modeling autonomic computing (AC) systems is provided. Such background includes how AC systems can be organized into macrostates and meta-dynamic states (MDS's). Second, how such modeling allows for AC systems to be self-aware is described. Third, how AC systems being self-aware enables them to be self-healing is described. Fourth, and finally, a representative method and system in which these self-aware and self-healing properties of AC systems as modeled are leveraged are described.

Modeling Autonomic Computing (AC) Systems

A computing system may be considered as having a number of components, with each component performing a particular function or functionality. A computing system is able to perform simple tasks on its components. Such tasks can include turning off and turning on components, modifying parameters of the components, increasing the threads of the components, and so on. These tasks involve changing microstates of the components, where a microstate of a component may be considered as the component being in an "on" state (binary one), or an "off" state (binary zero). A well-planned series of such state changes is usually able to get a computing system out of problems, such as when the system appears to be headed towards failure or irreparable deadlock.

However, the components forming a system do not exist in isolation. Every microstate change within a component can cascade to the components connected to it, resulting in changes to the macrostate of the system as a whole. A macrostate of a system is the global state formed by mapping the individual microstates of its components, using an appropriate mapping function. Embodiments of the invention, instead of analyzing particular problems that may arise in only some types of systems, analyze computing systems with a general model, which can be adapted to specific types of systems.

An autonomic computing (AC) system is a computing system that has the following properties. It is a dynamic system, and has a number of interconnected components, each of which can be in one of a number of different states, which are referred to herein as microstates. The components undergo complex interactions among themselves, changing the states of the components, which in turn influences the state of the system as a whole, referred to as a macrostate. AC systems evolve into a large multi-dimensional state space as time passes, in discrete steps, within a discrete state space. AC systems further evolve based on defined rules that dictate which macrostate the systems proceed to next, given the present state.

Furthermore, with respect to self-aware and self-healing properties of AC systems, in accordance with embodiments of the invention, there are other aspects of AC systems. First, AC systems will at times be subject to perturbations, caused internally or externally, such that the systems enter into states that are detrimental. To recover from these states, the AC systems have to be self-aware to recognize that they have entered into these states, and have to be self-healing to recover therefrom. Furthermore, one aspect of self-healing is self-protection, in which AC systems learn that they are headed towards an undesirable state.

AC systems can be modeled as dynamical systems having n components interacting with one another. These components can evolve within a continuous state space by assuming a continuous range of values, or within a discrete state space by assuming a finite set of discrete values. As a result, dynamic systems can either be continuous space dynamical systems or discrete space dynamical systems. Furthermore, depending on whether the system dynamics evolve in continuous time or at discrete intervals, dynamical systems can be classified as continuous-time dynamical systems or discrete-time dynamical systems. AC systems in which there are components with finite sets of discrete states, are thus modeled as discrete-time discrete-space dynamical systems (DDS's).

Within a DDS, if each of the n components has s states each, then the state space of the system has $s^n$ states. A two-state DDS is described herein for descriptive and illustrative convenience; however, embodiments of the invention are applicable to extrapolation and extension to DDS's having state spaces with more than two states. Where the number of states is two, the components are binary components, and the resulting system, or network, for studying its dynamics is referred to as a random Boolean network (RBN). An RBN is random in the sense that the connection rules can be generated at random for simulating a large range of systems, or networks. RBN's thus are successfully used to model the dynamics of complex systems.

FIGS. 1A, 1B, 1C, and 1D show an example RBN architecture, and how the dynamics of an RBN are defined as a set of rules, according to an embodiment of the invention. FIG. 1A shows an RBN 100 where n=8, such that the RBN has a set of eight interconnected nodes 108A, 108B, 108C, 108D, 108E, 108F, 108G, and 108H, collectively referred to as the nodes 108. Each of the nodes 108 can be in one of two states S={0, 1}. The elements of the set S are referred to as the microstates of the computing system. Depending on the microstate of each of the nodes, or components, 108, the global state of the system can be determined, which is referred to as the macrostate of the computing system.

The nodes 108 affect one another, such that their states at the time $t_{n+1}$, in which the nodes 108 are indicated as the nodes 108' for differentiation, as compared to at the time $t_n$ can change depending on the interaction among the nodes 108. This is represented by the network of lines 106, where at the time $t_{n+1}$ each of the nodes 108' has its state affected by the states of three of the nodes 108 at the time $t_n$. This is further described subsequently in relation to FIGS. 1C and 1D.

Figure 1B:
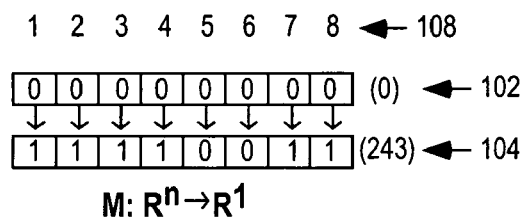

Next, FIG. 1B shows the global state, or macrostate of the computing system as a whole. If the components, or nodes, 108 are in states as shown in the first row 102, then the microstates 00000000 results in a macrostate of 0, since the binary number 0x00000000 is the decimal number 0. Similarly, if the components, or nodes, are in states as shown in the second row 104, then the microstates 11110011 results in a macrostate of 243, since the binary number 0x11110011 is the decimal number 243. The row 102 may correspond to the macrostate of the system at time $t_n$, whereas the row 104 may correspond to the macrostate of the system at time $t_{n+1}$. The mapping between component or node microstates and the system macrostate is defined by a mapping function M that maps the n-dimensional state space $R^n$ of the components or nodes 108 to a one-dimensional number line $R^1$.

Figure 1C:
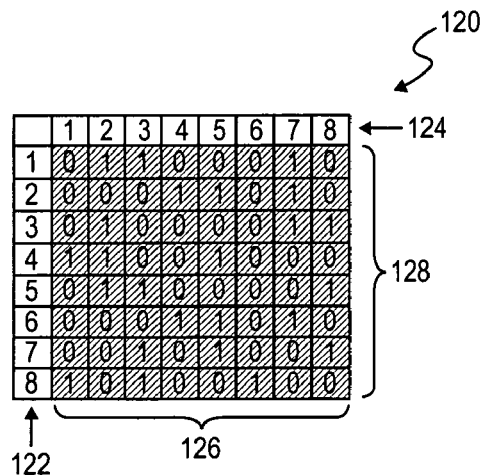
Figure 1D:
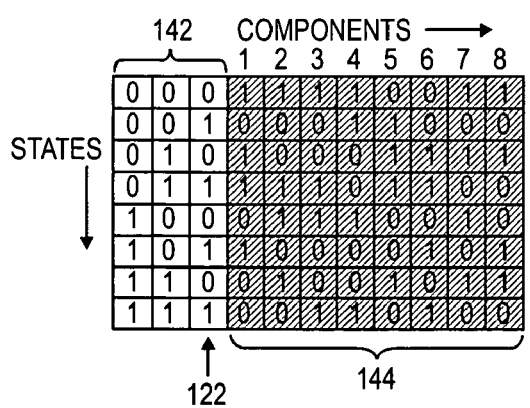

FIGS. 1C and 1D depict the rules that govern the RBN 100 of FIG. 1A. FIG. 1C specifically depicts the connectivity rules 120 among the nodes 108 of the RBN 100. The connectivity rules 120 are also referred to as the k rules, with k indicating the connectivity index of the RBN 100. RBN's may have either fixed-k rules or mixed-k rules. A fixed-k rule means that all the components have the same number of components connected to their inputs. In the example RBN 100 of FIG. 1A, there is a fixed-k network with k=3. This means that every node is influenced by exactly three other of the nodes, one of which may be the node itself. Mixed-k networks are those in which the connectivity varies for the components.

The k-rules are captured within an n-by-n matrix, as depicted in FIG. 1C. Each of the rows 128 represents a node, as denoted by the legend 122. Furthermore, there are n columns 126, one for each of the nodes, as indicated by the legend 124. A value of one in the row, column cell (i, j) indicates that the $i^{th}$ node is connected to the $j^{th}$ node. Thus, the connectivity rules 120 of FIG. 1C depict in matrix form the connectivity indicated by the network of lines 106 in FIG. 1A. For example, the first node 108A, as indicated by the first of the rows 128, is connected to the second node 108B, the third node 108C, and the seventh node 108G, as indicated by the second, third, and seventh of the columns 126 having values of one, and the other of the columns having values of zero within the first of the rows 128.

FIG. 1D specifically depicts the update rules 140 among the nodes 108 of the RBN 100. The update rules provide, for all combinations of the microstates of each of the nodes 108, what the next state of the node is. Thus, where k is the connectivity among the nodes 108, each of the nodes 108 has $2^k$ possible combinations of microstates for which an update rule is to be provided. In FIG. 1D, because k=3, there are $2^3=8$ possible update rules for each node. The columns 142 denote for a given node the three values of the microstates of the nodes 108 to which the node is connected, as indicated in the connectivity rules 120 of FIG. 1C. The columns 144 thus denote which microstate this node is to take on in the next time step.

For example, as has been described, the first node 108A is connected to the second node 108B, the third node 108C, and the seventh node 108G, as indicated by the connectivity rules 120 of FIG. 1C. If these three nodes 108B, 108C, and 108G have microstates 0,0,0 at a given time step, at the next time step the first node 108A has the microstate 1. This is determined by the update rules 140 of FIG. 1D as follows. The columns 142 are referred to in order to determine a row equal to the microstates 0,0,0 of the nodes 108B, 108C, and 108G to which the node 108A is connected. This is the first row. Next, the specific column of the columns 104 corresponding to the first node 108A is examined within the first row. This is the first column of the columns 144, which has a value of one for the first node 108A in the first row. Therefore, at the next time step, the first node 108A has the microstate 1, given that the three nodes 108B, 108C, and 108G to which the node 108A is connected have the microstates 0,0,0 at the current time step.

The dynamics of the RBN 100 are next described on a system-wide basis, where the update rules 140 of FIG. 1D are employed as has been exemplarily described in the preceding paragraph. $S_n$ is the macrostate of the system at time $t_n$. The state of the system at the next instant $t_{n+1}$, $S_{n+1}$, is given by $S_{n+1}=f(S_n)$, where the function f is defined by the connection rules 120 and the update rules 140. The function f is described in relation to the example of FIG. 1B. If the macrostate of the AC system is 0x00000000 at time $t=t_n$, then at time $t=t_{n+1}$, the macrostate of the system is 0x11110011, as follows. The first node 108A is connected to the second node 108B, the third node 108C, and the seventh node 108G, per the connectivity rules 120 of FIG. 1C. Because the values of the nodes 108B, 108C, and 108G are 0, 0, and 0, the update rule for the node 108A specifies that it takes on a microstate of one, per the update rules 140 of FIG. 1D.

The second node 108B is connected to the fourth node 108D, the fifth node 108E, and the seventh node 108G, per the connectivity rules 120 of FIG. 1C. Because the values of the nodes 108D, 108E, and 108G are 0, 0, and 0, the update rule for the node 108B specifies that it takes on a microstate of one as well, per the update rules 140 of FIG. 1D. The third node 108C is connected to the second node 108B, the seventh node 108G, and the eighth node 108H, per the connectivity rules 120 of FIG. 1C. Because the values of the nodes 108B, 108G, and 108H are 0, 0, and 0, the update rule for the node 108C specifies that it takes on microstate of one, per the update rules 140 of FIG. 1D. This process is thus performed for all of the remaining nodes 108D through 108G, where the connectivity rules 120 of FIG. 1C are examined to determine to which three nodes each node is connected, and then the current values of these three nodes are looked up in the update rules 140 of FIG. 1D to determine the next value of each node. Thus, given $S_n$=0x00000000=0, then $S_{n+1}$=0x11110011=243.

DDS's, and thus RBN's, can have their dynamic behavior within the state space organized into distinct attractors and basins of attraction. As the dynamics of DDS's evolve, at some point in time, the system reaches a state, or set of states, when the dynamics of the system freezes, or stabilizes, at this state or set of states. This state is a stable state for the system. If the system reaches this state, then the system does not proceed forward to any other state and remains in this state unless there is a perturbation that dislodges the system from this state to a different state. This state, or set of states, is referred to as an attractor. A DDS may have more than one attractor. If there is only one single state within the attractor, then it is referred to as a point attractor. If the system cycles among a set of k states, then the attractor is referred to as a k-cycle attractor or a periodic attractor with the period k.

The states that do not belong to the set of stable states, or attractors, are referred to as the basins of attraction, by comparison. These states are not stable states in the sense that the system never stabilizes to them. They are thus unstable or transient states. Such states are visited by the system only en-route to stabilizing at an attractor. The system never stays in these states for more than one time cycle. These transient states are organized at different levels away from an attractor. Thus, there may be a state that takes two time steps to reach an attractor, and such a state is in the second basin of the attractor.

Figure 2:
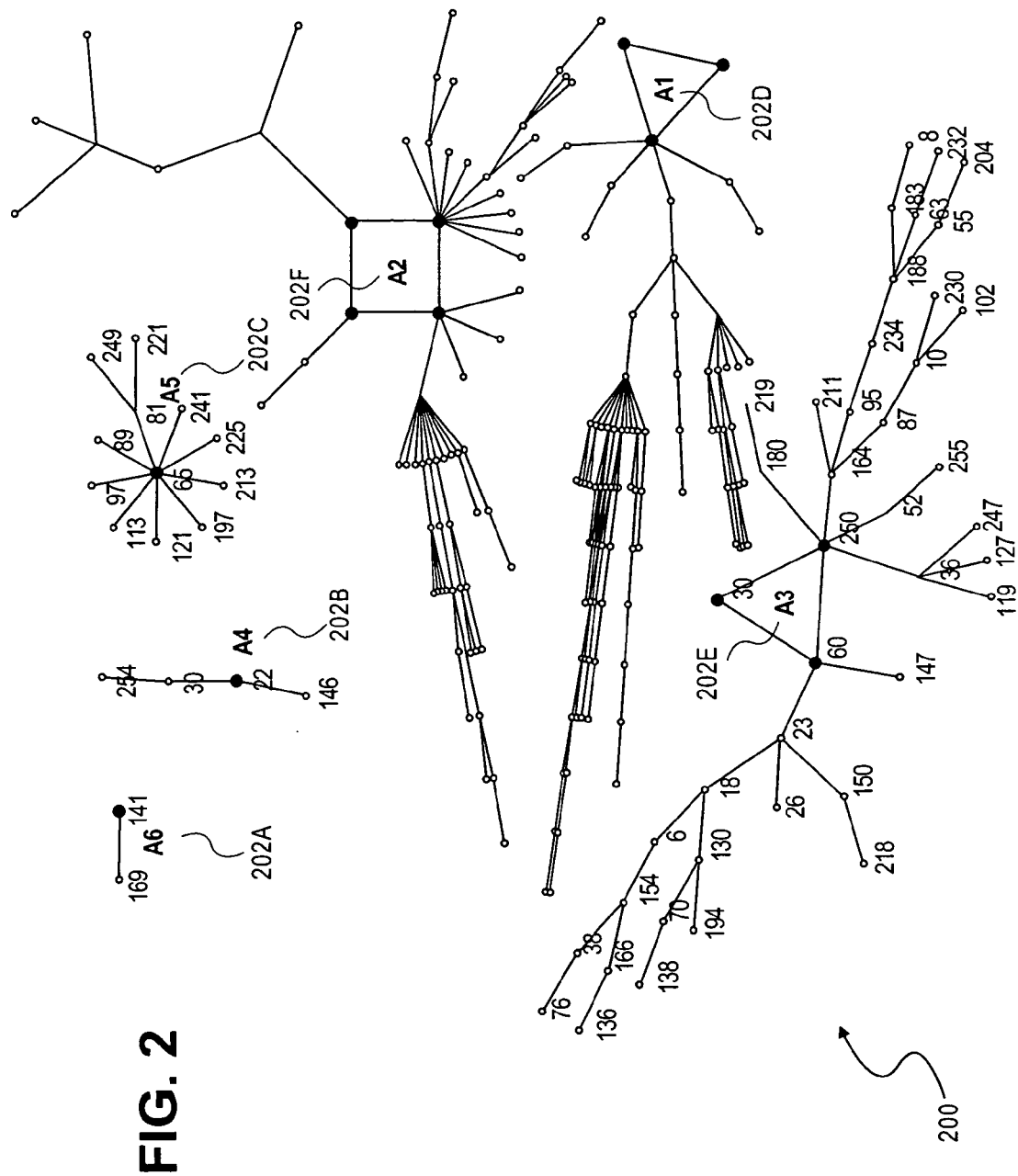
FIG. 2 is a diagram of an attractor-basin map of the RBN of FIG. 1, according to an embodiment of the invention.

FIG. 2 shows an attractor-basin map 200 of the RBN 100 of FIG. 1, according to an embodiment of the invention. The attractor-basin map 200 depicts the following dynamical organization of the RBN 100. There are six attractors 202A, 202B, 202C, 202D, 202E, and 202F, collectively referred to as the attractors 202, and which are numbered A1 through A6 in FIG. 2. The states denoted by filled-in, or solid, circles in FIG. 2 are the attractor states of the attractors 202. Thus, the attractors A4, A5, and A6 are point attractors; the attractors A1 and A3 are three-cycle attractors, or periodic attractors with a period of three; and, the attractor A2 is a four-cycle attractor, or a periodic attractor with a period of four.

Each of the attractors 202 has several states stabilizing to them, which are denoted by hollow circles in FIG. 2. For example, the attractor A5 has two basins of attraction. The first basin includes nine states: 81, 89, 97, 113, 121, 197, 213, 225, and 241. The second basin of attraction for this attractor includes two states: 249 and 221. The basins of the attractors 202 can be referred to as AxBy, where x is the attractor number and y is the basin number. For instance, the two basins of the attractor A5 can be referred to as A5B1 and A5B2. Similarly, the thirteen basins of the attractor A1 are sequential numbered A1B1, A1B2, ..., A1B13. The attractors 202 themselves are AxB0 to differentiate the stable states of an attractor from the entire attractor and its associated basins.

Such higher levels of organization are description of what the states contained within them are doing. As such, they are referred to as meta-dynamic states (MDS's), because they are descriptions of the dynamics of the states that are present therein. For instance, all of the attractors and basins of attraction, such as A1B0, A1B1, A2B0, and so on, are MDS's. Embodiments of the invention therefore track the dynamics of a DDS in terms of MDS's. More particularly, the microstates of the components or nodes of a system are organized into the macrostates of the system, and the macrostates of the system are organized into MDS's.

Figure 3:
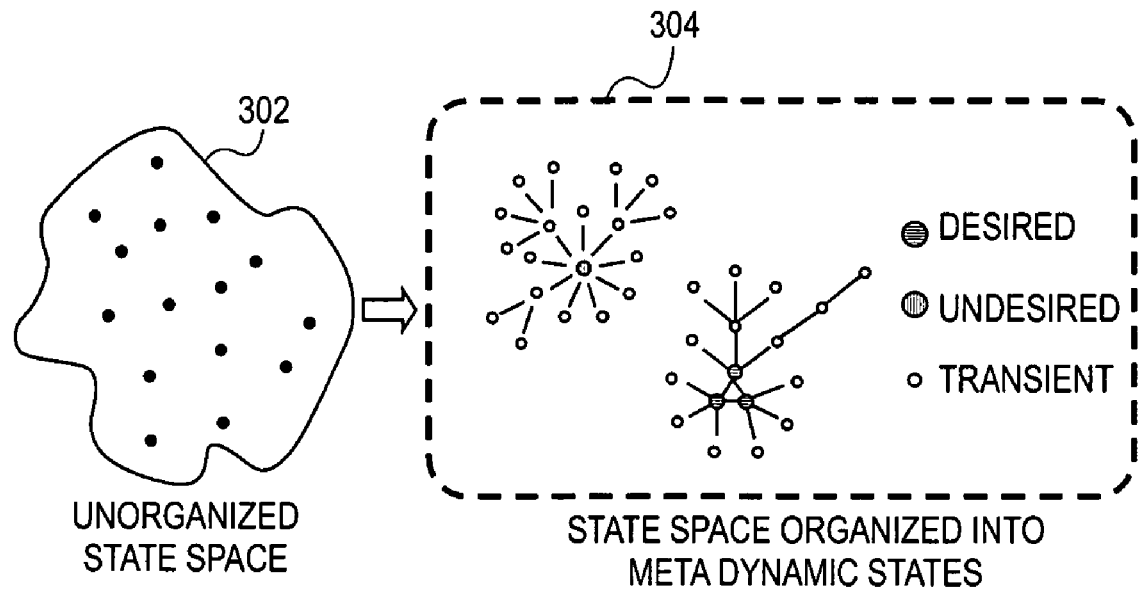
FIG. 3 is a diagram depicting how an unorganized state space can be organized into an organized state space having desirable, undesirable, and transient meta-dynamic states (MDS's), according to an embodiment of the invention.

Embodiments of the invention provide another level of organization or categorization. The stable attractors of a system may be desirable or undesirable. Desirable attractors are organized to a set D, and undesirable attractors are organized to a set U, whereas the rest of the MDS's are organized to a transient set T. FIG. 3 thus shows how an unorganized state space 302 can be organized into an organized state space 304, according to an embodiment of the invention. Within the organized state space 304, there are thus desirable or desired MDS's, undesirable or undesired MDS's, and transient MDS's. It is noted that transients associated with a desirable attractor are desirable transients, and transients associated with undesirable attractors are undesirable transients.

Figure 4:
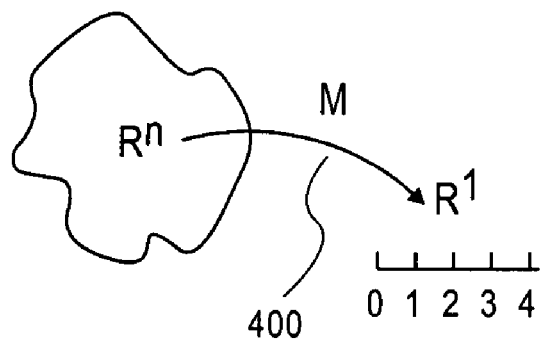
FIG. 4 is a diagram depicting a mapping function mapping an n-dimensional state space to a one-dimensional number line, according to an embodiment of the invention.

Finally, FIG. 4 shows a mapping function 400, according to an embodiment of the invention. The mapping function 400, or M, maps an n-dimensional state space to a one-dimensional number line, such that M: $R^n \rightarrow R^1$, where $R^n$ is the n-dimensional state space of a dynamical system, and $R^1$ is the number line to which it is transformed. Such a mapping function allows for simpler algorithms and easier analysis of the state space, such as detecting attractors and basins of attraction. In one embodiment, the mapping function is a simple binary-to-decimal number conversion, which ensures that the entire state space is represented by a unique integer that is obtained after converting the binary digits of the node values in order. For example, in FIG. 1B, the state represented by the binary number 0x11110011 is mapped to 243 by this mapping function.

Self-Awareness

In this section of the detailed description, how a system, such as an autonomic computing system, which is modeled as a DDS can become self-aware, using the DDS modeling of the previous section of the detailed description, is described. An autonomic computing system is assumed for this description, which has dynamics represented by FIG. 2, and is undergoing its normal functioning within a desirable attractor having the MDS A3B0. The system is then perturbed, and the MDS of the system is suddenly shifted to another MDS.

Figure 5:
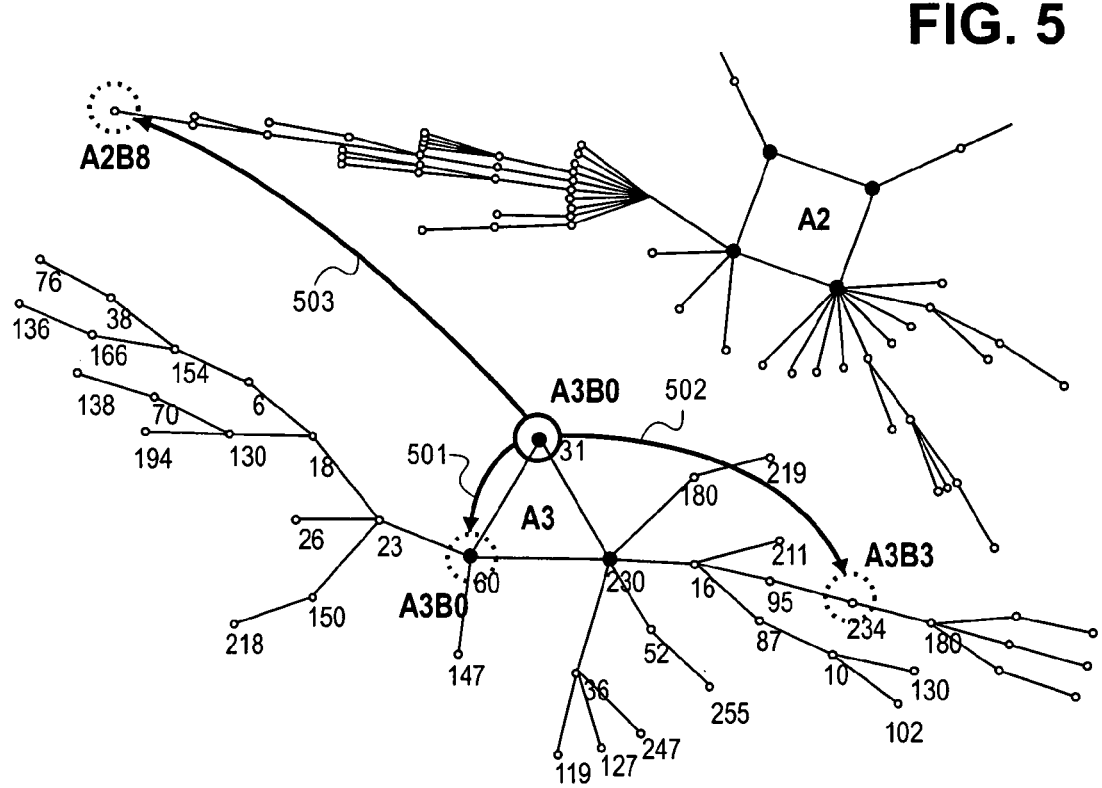
FIG. 5 is a diagram depicting different possibilities that can result from perturbation of a representative computing system, according to an embodiment of the invention.

FIG. 5 shows the different possibilities that can result from perturbation of such a system, according to an embodiment of the invention. First, as indicated by the reference number 501, the state into which the system is perturbed may be part of the same MDS A3B0, with the system moving from the state 31 to the state 60. Second, as indicated by the reference number 502, the system may be perturbed into part of an MDS A3B3 attached to the same attractor, with the system moving from the state 31 to the state 234. Third, as indicated by the reference number 503, the system may have reached a completely different MDS A2B8, with the system moving from the state 31 to the state 187. In the first case, there is no cause for concern, since the system is still part of the same MDS A3B0. In the second case, the system will eventually reach the original attractor after three time cycles, by virtue of its being in a basin of attraction of the same attractor, which may or may not warrant preventative action.

However, in the third case, the system has reached a completely new state. Because embodiments of the invention have information as to whether the new MDS is part of a desirable set or an undesirable set of MDS's, the system is now aware as to whether corrective action should or should not be accomplished, thus leading to self-awareness. For instance, the attractor A2 may be within the undesirable set of MDS's U. Therefore, an alert may be triggered indicating that the system is heading towards an undesirable state, since in eight time intervals, the system will more than likely reach the undesirable attractor. The system is thus aware that it has reached a state from which it should heal itself. Stated another away, if reaching the actual attractor is the eventuality from which the system should protect itself, then the system is now aware that it will reach an undesirable state in the future, and should perform a corrective action. In this way, embodiments of the invention provide for systems that are self-aware.

It is noted that dynamical systems that are well designed for stability should satisfy the criterion that its attractors are well isolated from one another. In other words, the attractors of the system should be impervious to small perturbations. In the case of an RBN, microstate changes of individual components, such as single bit flips of the binary variables, should not shift the system from one attractor to another. Where this is not the case, the system will be vulnerable to minor perturbations, and will keep shifting from one stable state to another.

Therefore, in one embodiment, an attractor separation map is constructed, which graphically depicts how well the attractor states are separated from one another in terms of hamming distance. Hamming distances are a way to measure the distances between two binary numbers. The hamming distance between two binary numbers is the number of bits that have different values. Given two binary numbers 0x10010010 and 0x11110000, the hamming distance between them is three, because the two numbers do not match at positions two, three, and seven.

Figure 6:
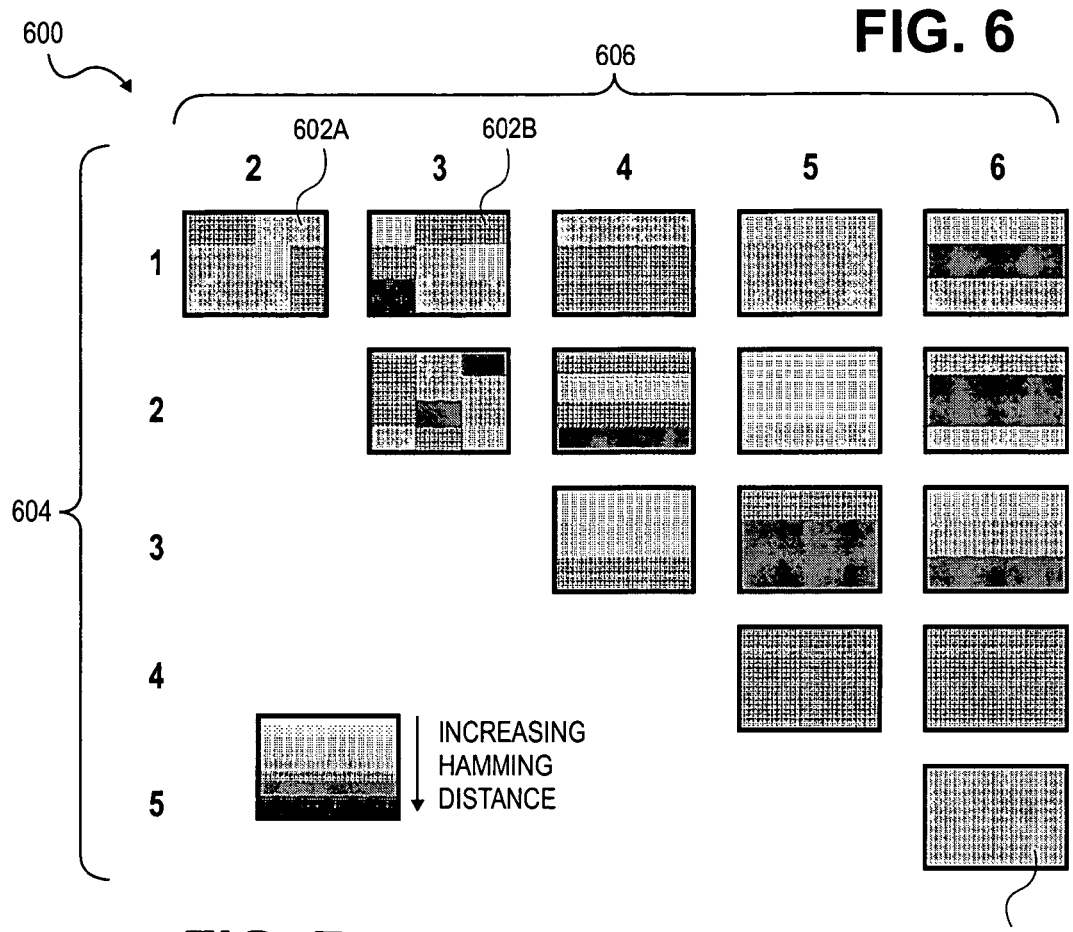
FIG. 6 is a diagram of an attractor separation map that graphically depicts how well attractor states of a computing system are separated from one another, according to an embodiment of the invention.

FIG. 6 shows such an attractor separation map 600 that graphically depicts how well the attractor states are separated from one another, according to an embodiment of the invention. The attractor separation map 600 includes a number of boxes 602A, 602B, ..., 602N, collectively referred to as the boxes 602, and which are organized into five rows 604 and six columns 606. Each of the boxes 602 represents the separation between the attractors indicated in the rows 604 and the columns 606. A darker shade indicates a larger separation between the two attractors in terms of their hamming distance, whereas a lighter shade indicates that the two states are separated by a small hamming distance.

The map 600 further provides a state-to-state comparison. For example, the box 602A indicates that the separation between attractors 1 and 2 is further divided into three rows and four columns. This is because there are three states in attractor 1 and four states in attractor 2, as shown in FIG. 2 for instance. Furthermore, as another example, viewing the map 600 reveals that attractors 5 and 6 are closely located, because of their lighter shade in the box 602N.

Embodiments of the invention can also be made highly scalable, via component aggregation. If the number of components becomes too large, then the state space becomes intractable for computation. In such situations, related components may be grouped together under a common node. The parent component has to know what its state represents in terms of the microstates of the components under it.

Figure 7:
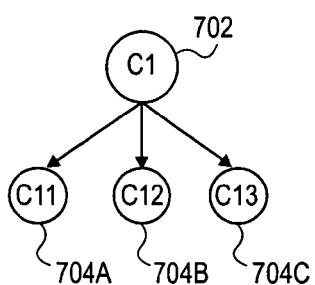
FIG. 7 is a diagram depicting how components of a computing system can be scaled, according to an embodiment of the invention.

FIG. 7 shows an example scaling of components, according to an embodiment of the invention. The parent node 702, or C1, is made up of three sub-nodes 704A, 704B, and 704C, collectively referred to as the sub-nodes 704, and also referred to as the nodes C11, C12, and C13. The dynamics of the sub-nodes 704 are not exposed to the state space of the system as a whole. Rather, just the dynamics of the node 702 are exposed to and contributed to the state space of the system as a whole. However, the node 702 is aware of how its state is determined in terms of the microstates of the sub-nodes 704 under it. Therefore, when the node 702 reaches a particular state, it is because of the microstates of the sub-nodes 704 thereunder. Similarly, when the state of the node 702 is set by another component, or node, the node 702 knows to what microstates it should set each of the sub-nodes 704.

Self-Healing

This section of the detailed description describes how computing systems can become self-healing, in light of their already being self-aware as described in the previous section of the detailed description. That is, autonomic computing systems are self-aware in that they are aware that they have reached undesirable states. This is accomplished by leveraging the organization of the state space of a computing system into basins of attraction and attractors, such that the state space is organized into MDS's. The MDS's are categorized into desirable and undesirable stable states, as well as transient states. In this way, embodiments of the invention become self-aware, such that they know whether a given MDS that has been reached is desirable or undesirable. Therefore, in this section, self-awareness is used as a springboard from which self-healing is achieved, as is now described.

In a general sense, because a computing system has organized its state space into MDS's, and further into desirable, undesirable, and transient MDS's, it can track itself in terms of these reduced parameters rather than the entire state space as a whole. As soon as a system detects that it has reached an undesirable state, the system is guided to the nearest desirable MDS. This recovery path is a series of well-planned microstate changes made at appropriate times, so that the system reaches the desired state with the least effort in terms of time and computation cost. This general technique further leverages the property of dynamical system invariance (DSI).

DSI is the property by which dynamical systems can exist in a multitude of states, yet remain the same as far as the dynamics of the system are concerned. By this property, all states within the same MDS are invariant insofar as the dynamics of the system are concerned. For example, all nine states found in A5B1, which is the first basin of the attractor A5 are invariant in the sense that all these states move to their attractor, A5B0 within the next time step. Therefore, it does not matter in which of these nine states the system exists; what does matter is that all of them reach an attractor within the next time step. Systems can thus recover by planning a path of microstate changes so that the system jumps from one MDS to another, and eventually reaches a desirable stable state. Each microstate change that is initiated is associated with a cost.

Figure 8:
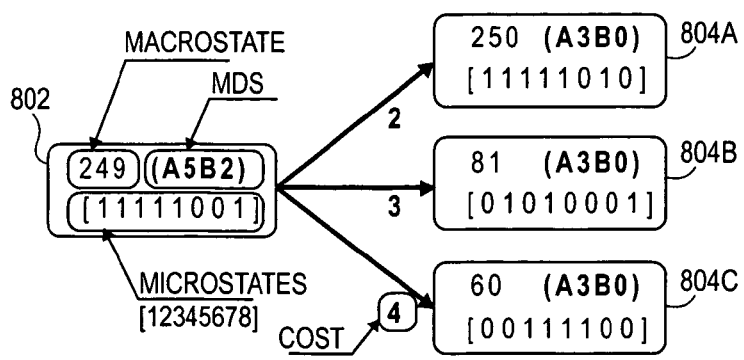
FIG. 8 is a diagram showing how the property of dynamical system invariance (DSI) is leveraged by associating a cost for changing the global dynamics of a computing system in terms of its microstates, according to an embodiment of the invention.

FIG. 8 shows how DSI is leveraged by associating a cost for changing the global dynamics of a computing system in terms of its microstates, according to an embodiment of the invention. The state identified by the reference number 802 is the state 249, which is in the MDS A5B2 in FIG. 2. It is assumed that this is the state to which the computing system was moved after a perturbation. Furthermore, using self-awareness, the system has determined that it has entered an undesirable state; that is, the state 249 is undesirable. The system may also have determined that reaching a desirable stable attractor is important, which in this case is the desired attractor A3B0.

From the state 249, which is in the MDS A5B2, to reach the MDS A3B0, there are three possible paths, because there are three states within the MDS A3B0, as indicated by the reference numbers 804A, 804B, and 804C. If the system reaches any of these three states, then it is in the desired attractor. The first path, to the first state within the MDS A3B0 as indicated by the reference number 804A, is achieved by altering the microstates of components 7 and 8, where the components are numbered as shown in FIG. 8. The second path, to the second state within the MDS A3B0 as indicated by the reference number 804B, is achieved by altering the microstates of components 1, 3, and 5, whereas the third path, to the third state within the MDS A3B0 as indicated by the reference number 804C, is achieved by alternating the microstates of components 1, 2, 6, and 8.

The numbers next to the paths indicate the number of microstate changes of components needed to reach the MDS A3B0 from a state in which is in the MDS A5B2. By virtue of the DSI property, it is known that it does not matter which state of the MDS A3B0 is entered. However, there is a cost for each of the microstates that have to be changed to reach that stated. Therefore, the system selects the path to follow from the paths that lead to the desired MDS, but requires the least cost, in terms of microstate changes, in order to do so.

Furthermore, instead of having just a fixed cost, the cost of each microstate change can be modeled as k+v, where k indicates the fixed cost associated with changing the state of that component, and v indicates the variable cost, which is a function of an actual system. For example, one of the components might be a database system that has the states "optimal performance," and "reduced performance." After a perturbation, the system may identify a path that involves changing the microstate to reduced performance, where originally the database system was operating at optimal performance. However, changing the microstate to reduced performance may not want to be accomplished unless this is the only way to recover from the perturbation. Therefore, there may be a high variable cost associated with such a microstate change. If there is a lesser cost alternative, then the system will select such an alternate path, avoiding the state where the database system performs at a reduced performance level.

An illustrative example is now described that combines the self-awareness previously described, and the action that a computing system takes in response to such awareness. The autonomic computing system having the dynamics shown in FIG. 2 is employed. The computing system is operating normally, but is then perturbed to state 10, or MDS A3B3. The awareness component of the computing system detects that the system has entered an undesirable state, because the stable states of the attractor in question are in the undesirable set U. Furthermore, it is presumed that the desired state to which the system is to reach under the given circumstances is the MDS A2B1, which is the first basin of the attractor A2. Therefore, the goal is to find the optimal microstate changes to reach the MDS A2B1 from state 10, MDS A3B3. In doing so, the computing system leverages the DSI property that has been described.

Figure 9:
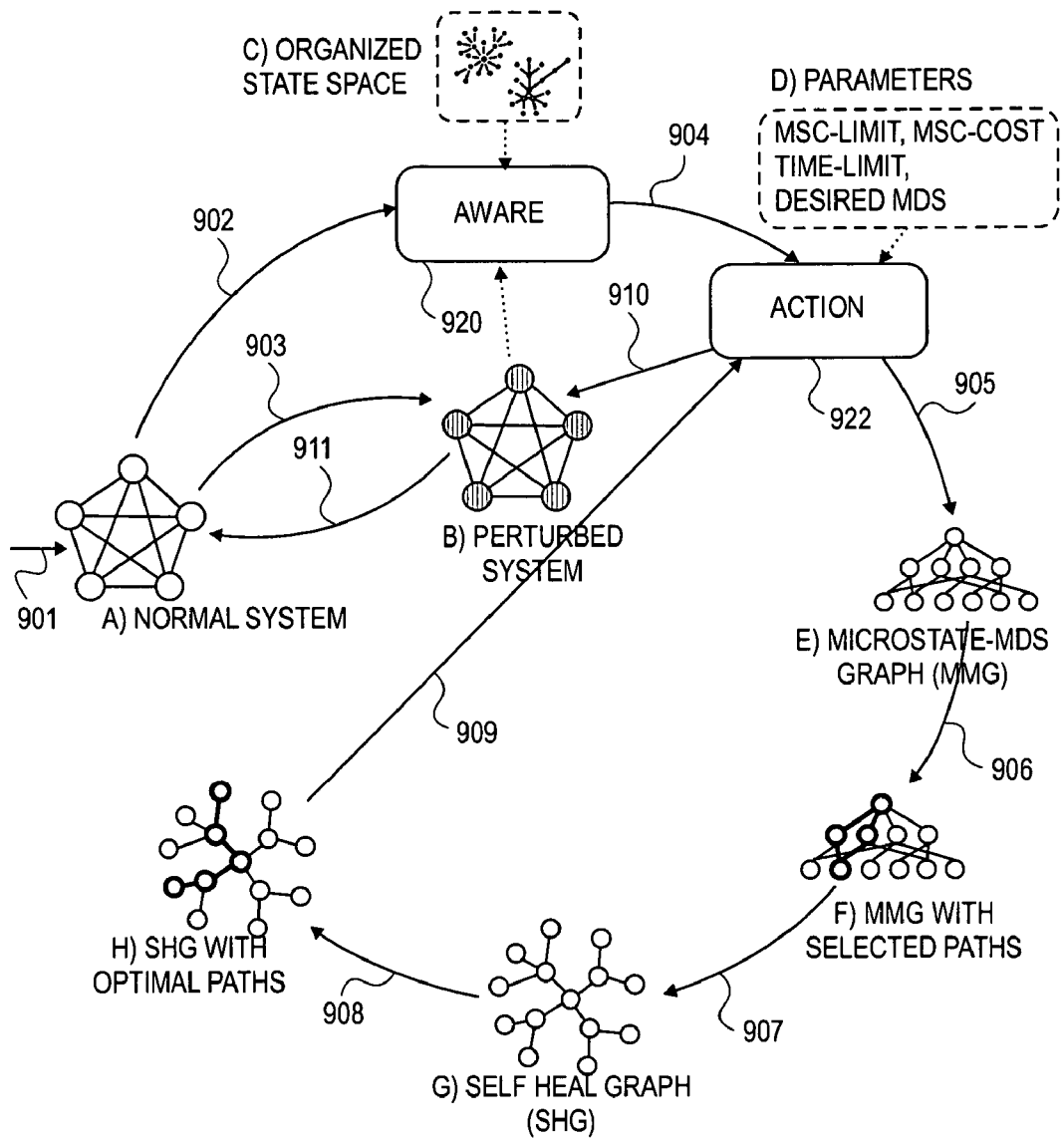
FIG. 9 is a diagram illustratively depicting the process that occurs from the time a normally functioning autonomic computing system is perturbed, until the point in time at which it heals or protects itself from this perturbation, according to an embodiment of the invention.

FIG. 9 illustratively depicts the flow of events that occur from the time a normally functioning autonomic system is perturbed, until the point at which it heals or protects itself from this perturbation, according to an embodiment of the invention. FIG. 9 is meant as an overview. After the entire process of FIG. 9 is described, the action-oriented functionality of the process is described in more detail. First, then, as indicated by the arrow 901, a normally functioning autonomic computing system A is perturbed by an external force or by internal inconsistencies. The system is forced to move into a state that it may have no knowledge of. In terms of the dynamics of the system, this state may lead to a desirable attractor or an undesirable attractor. If the latter case is true, then the system has to take steps to identify the nearest desirable stable state and reach it.

Next, as indicated by the arrow 902, the system triggers an alert to the aware component 920 that is responsible for creating awareness of benevolent and malevolent states into which the system can be perturbed. The input to the component 920 is the dynamic state space C of the system organized into MDS's, as has been described in the previous section of the detailed description. The component 920 decides whether the perturbed state that the system is currently in needs to be healed or to be protected from reaching a future undesirable state.

As indicated by the arrow 903, the system itself has entered a perturbed state, such that the system is indicated by the letter B. As indicated by the arrow 904, the component 920 determines whether this perturbed state is desirable or undesirable, and, presuming for this example that the perturbed state is undesirable, notifies the action component 922 that the perturbed state is undesirable. As indicated by the arrow 905, the action component 922, the functionality of which is described in more detail later in this section of the detailed description, utilizes a number of parameters D to determine the best course of action to move the computing system back to a desirable state. These parameters include a microstate change (MSC) limit, an MSC cost, a time limit, and a desired MDS, as are described in more detail later in this section of the detailed description.

Using these parameters, as will be explained in more detail, the action component 922 thus generates, or constructs, a microstate/MDS graph (MMG) E, which depicts which MDS's are visited by the system corresponding to the microstates that are changed in accordance with the parameters. As indicated by the arrow 906, the MMG construction is monitored, and as soon as the desired MDS is reached during construction, the MMG is finished. After this, all the paths of the MMG, starting from the starting MDS and ending at the desired MDS, are selected within the MMG, thus leading to the MMG F.

Next, as indicated by the arrow 907, using the selected paths of the MMG, the final optimized path for self-healing is constructed, using a self-heal graph (SHG) G. The SHG is the MMG reorganized by expanding the individual states that contributed to reaching the desired MDS in question. The starting state, which is the undesired perturbed state, is at the center of the SHG, and the radial branches extending outward from this state all lead to the peripheral nodes of the SHG, which are all part of the desired MDS. These peripheral nodes are thus the resting states of the system that are reached when the action component 922 executes any given path of the graph.

To determine which of these paths to execute, the action component 922 selects the paths with the least cost, such that the SHG is constructed with these optimal paths selected, as indicated by the arrow 908. The action component 922 selects one of these paths to use, as indicated by the arrow 909, such that the action component 922 executes the selected path relative to the perturbed system, as indicated by the arrow 910, to progressively cause the system to return to a desired state. Thus, the computing system ultimately returns to a desired state, as indicated by the arrow 911.

The MMG constructed in the process of FIG. 9 is described in more detail. The MMG is the graph that the action component 922 constructs to determine which MDS's are reached by all possible microstate changes within a number of prescribed parameters. One such parameter is the MSC limit. The MSC limit is the maximum number of components that the system is allowed to force a microstate change on at the same time, to change the global dynamics of the system. Another parameter is the MSC cost. The MSC cost is the cost associated with each microstate change. This parameter thus determines which microstate changes should be avoided. As has been described, the cost of certain microstate changes can be raised deliberately high so that such microstate changes are used only as a last resort to return the system to a desirable state.

The time limit parameter determines how important it is for the system to return to normalcy after perturbation. This parameter is linked with the MSC cost and the MSC limit parameters. For example, if it is critical to have the computing system return to normalcy as soon as possible, then the action component 922 may be forced to use the maximum allowed limit of microstate changes specified in the MSC limit, and also use costlier alternatives to achieve self-healing. The time limit parameter thus describes the number of time steps in which return to a desirable state after perturbation into an undesirable state is to occur. Finally, the desired MDS is one of the desirable MDS's to which the computing system is to return.

The MMG can be considered as an elaboration of the DSI property of the computing system. The action component 922 begins construction of the MMG with the root node as the perturbed state from which the system is to recover. For example, a computing system may be perturbed and have entered state 10, or MDS A3B3, and the system must reach MDS A2B1. Thus, the action component 922 in such an example revolves around this explicit requirement. In order for the autonomic computing system to heal itself, somehow it has to reach the MDS A2B1 from its current state. The other constraints are therefore used in conjunction with the desired MDS constraint. For example, the MSC limit may be one, and the time limit may be five. This indicates that the action component 922 cannot force more than one component to change its microstate at the same time, and that the system should reach the desired MDS in less than five time steps.

Figure 10:
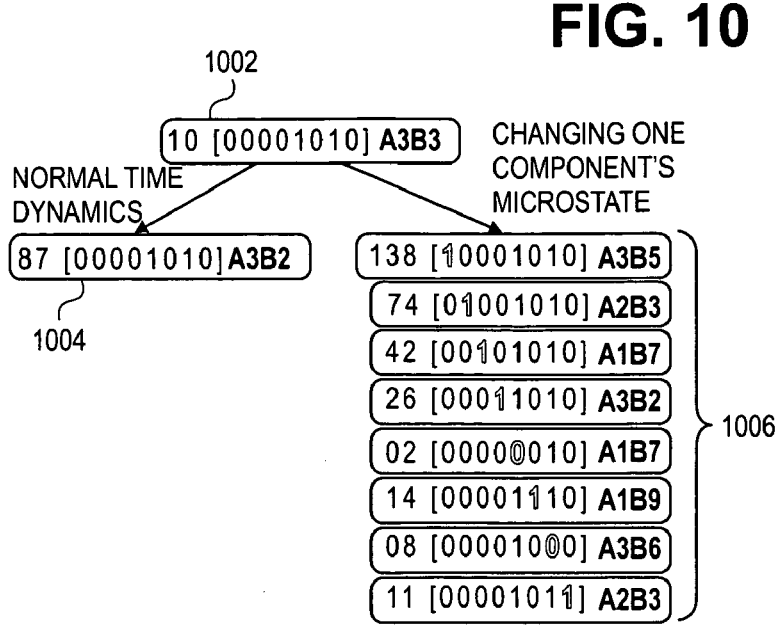
FIG. 10 is a diagram depicting the construction of a portion of an example microstate/MDS graph (MMG), according to an embodiment of the invention.

FIG. 10 shows an example of the construction of a portion of an MMG, according to an embodiment of the invention. The example of FIG. 10 presumes that the computing system has been perturbed and entered the undesirable state 10, or MDS A3B3, as indicated by the reference number 1002. Starting from this undesirable state 10, the action component 922 progressively constructs the various time levels of the MMG, where the example of FIG. 10 shows the first time level after the undesirable state 10. The state indicated by the reference number 1004 is arrived at by the natural dynamics of the computing system. That is, if the system were not to have forced microstate changes, it would proceed from the state indicated by the reference number 1002 to the state indicated by the reference number 1004. The other category of states that can appear in the first time level is that obtained by forced microstate changes, given the constraint parameters, as indicated by the reference number 1006. These states do not result from the normal dynamics of the system, but rather are forced by the action component 922.

The second category of states, indicated by the reference number 1006, is of particular interest, because the action component 922 has to have the system reach the MDS A2B1 from the MDS A3B3. If the system were to evolve according to its natural dynamic, it will never leave the attractor A3, whereas it is desired to have the system be in the attractor A2. That is, as depicted in FIG. 2, in three time intervals the computing system will reach the attractor A3 and remain there. Therefore, the action component 922 has to force changes in the dynamics of the system to steer the system towards the MDS A2B1, which means the second category of states is to be used.

If there are n components, and if at any given time, k components can be simultaneously forced to change their microstates, then that are a total of nCk states, or the combination of n components taken k at a time. The maximum k is the MSC limit parameter. For example, if k is one, then there are a total of n possible states in the next time interval, so in this case the MSC limit is one. At the first time limit, there is a total of eight states, in addition to the one state that is due to the normal dynamics of the system, as depicted in FIG. 10.

Out of these nine states, not all of them lead to nine different MDS's. It is known that each MDS has more than one state in it. Thus, keeping in mind DSI, the action component 922 maintains just one MDS at each time level, and keeps track of the individual states that enter into that MDS, either through normal time dynamics, or through microstate changes. Therefore, FIG. 10 shows the first time level of the MMG starting from the state 10. It is noted that although there are nine different states, that are only six unique MDS's at this time level: A3B2, A3B5, A2B3, A1B7, A1B9, and A3B6.

Figure 11:
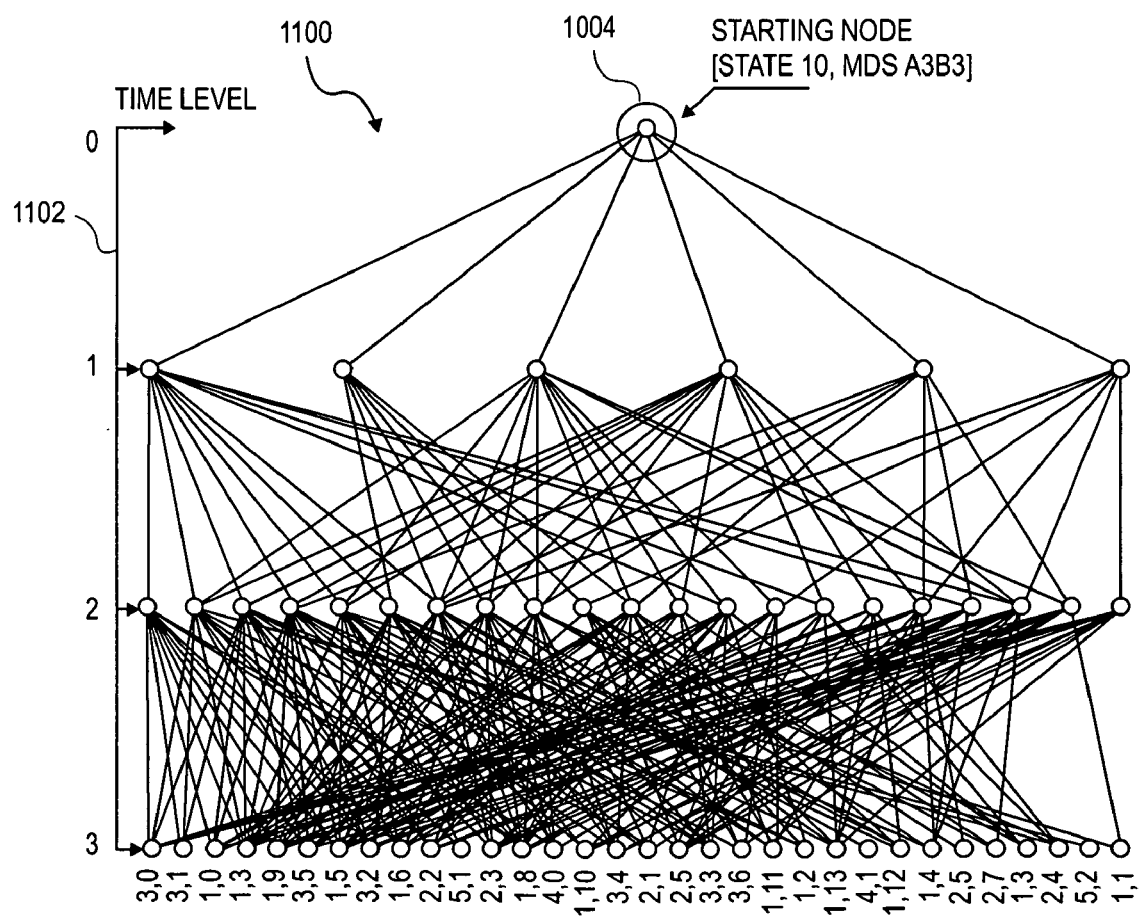
FIG. 11 is a diagram depicting the construction of the first three time levels of the example MMG of which the construction began in FIG. 10, according to an embodiment of the invention.

FIG. 11 shows the construction of an example MMG 1100, as begun in FIG. 10, to three time levels, according to an embodiment of the invention. As indicated by the axis 1102, the starting time is denoted as the time level zero. The nodes of the MMG 1100 represent the MDS's at each time level. The nodes and the edges among the nodes form a complex data structure that contains information about all the states that lead from each parent MDS to each child MDS. One property of the MMG is that it captures, without redundancy, all the MDS's that can be reached given the MSC limit and the time limit parameters. Thus, the MMG 1100 maintains the unique MDS's at each time level. This is why just six MDS's are depicted at the time level one, instead of the nine different states as in FIG. 10.

Figure 12:
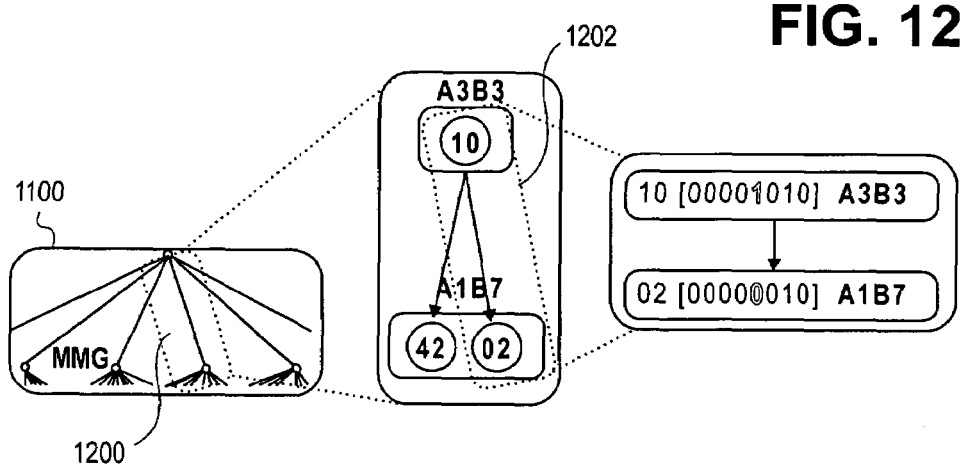
FIG. 12 is a diagram depicting an expanded view of a portion of the example MMG of FIG. 11, according to an embodiment of the invention.

FIG. 12 shows an expanded view of a part 1200 of the MMG 1100 of FIG. 11, according to an embodiment of the invention. In this part 1200, the MDS A3B3 leads to the MDS A1B7 by virtue of one of two macrostate changes. First, the macrostate 10 can change to the macrostate 42. Second, the macrostate 10 can change to the macrostate 02, as is shown in more expanded detail as the part 1202 in FIG. 12. In this part 1202 it is specifically depicted that changing the microstate of the fifth component from the left from one to zero causes the macrostate change from 10 to 02, which is thus one of the two changes that results in the MDS A3B3 leading to the MDS A1B7.

In general, an MMG is represented as a graph G(V, E). V are the MDS's of the computing system, starting from the root MDS to which the system has been perturbed, down to the desired MDS. V is a unique set at any given time level. E are the state transitions that connect the MDS's of the different time levels. As has been depicted in FIG. 12, an edge may contain multiple macrostate transitions, instead of just a single macrostate transition.

The MMG may also be considered as follows. First, M is the set of all MDS's. Each MDS can be considered to be a set of macrostates s, where s is a proper subset of the universal set S, which is the set of all the states of the computing system. $S=\{s_i\}$, where $i=1, 2, 3, \ldots, s$. M is thus $\{M_j\}$, where $j=1, 2, 3, \ldots, m$, and m is an integer. $M_j=s$ where s is a proper subset of S, as before. Therefore, the MMG can be defined in terms of an equivalence between the sets (V, E) and (M, S), where the set of nodes V of the MMG equals M. The edges E connecting any two MDS's $M_p$ and $M_q$, where p is less than or equal to m and q is less than or equal to m, can be considered a set of ordered pairs of states $(s_{from}, s_{to})$, such that both $s_{from}$ and $s_{to}$ are proper subsets of S, and further $s_{from}$ is a subset of $M_p$, and $s_{to}$ is a subset of $M_q$. States $s_{from}$ and $s_{to}$ are related by the microstate change function C, such that $s_{to}=C(s_{from})$. The function C can be represented as $C(N_c, S_c)$, where $N_c$ is the actual number of microstate changes and $S_c$ is the set of actual components whose microstates have changed.

At each stage of the construction of an MMG, the action component 922 determines whether the desired MDS has been reached. Once the desired MDS has been reached, the construction of the MMG is finished. The action component 922 then locates the microstate changes that contributed to reaching this desired MDS. For example, the desired MDS may be the MDS A2B1. This MDS is reached at time level 3. Therefore, the MMG construction is finished at time level three, and the paths that contributed to reaching the desired MDS are traced back.

Figure 13:
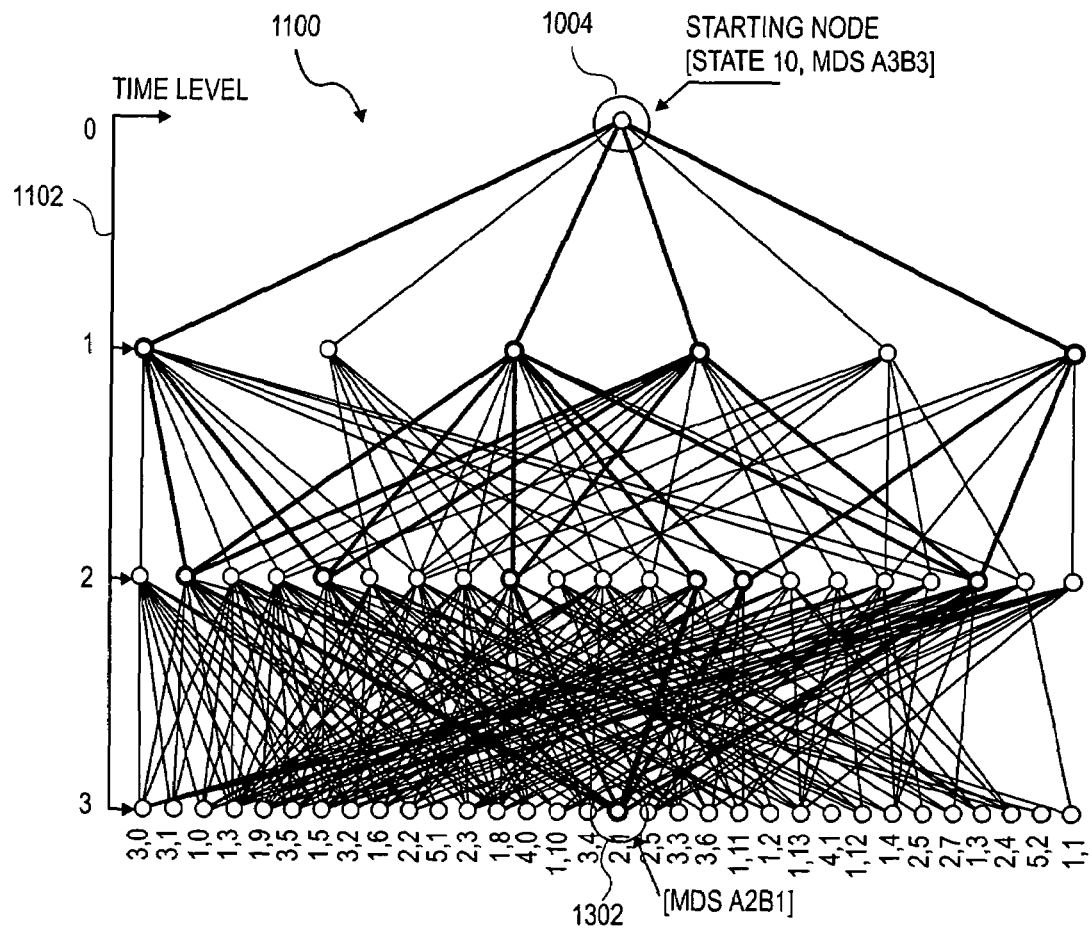
FIG. 13 is a diagram of the example MMG of FIG. 11 in which the paths from the undesirable starting MDS to the desirable MDS have been highlighted, according to an embodiment of the invention.

FIG. 13 shows the example MMG 1100 of FIG. 11, according to an embodiment of the invention. The paths from the desired MDS 1302, reached after three time levels as indicated by the axis 1102, back to the starting MDS 1104 are highlighted. These are the paths that are then considered as potential paths that the computing system is to move in order to reach the desired MDS 1302 from the undesirable MDS 1104. Thus, the MMG 1100 is pruned to contain just these paths that lead to the desired MDS 1302, after which the SHG is constructed from this pruned MMG.

Therefore, once the MMG has been constructed and the paths contributing to reaching the desired MDS have been identified, the SHG is constructed. The SHG is the MMG blown up in an expanded manner to show each of the individual states, because ultimately the action component 922 needs to effect state changes in order to cause the system to reach the desired MDS. At the center of the SHG is the undesirable MDS that the system has been perturbed to, and the SHG is constructed so that the states from the center to the periphery of the SHG result from microstate changes that are forced or that are due to the normal dynamics of the system. The nodes are labeled as (State: MDS(A,B): Cumulative Cost). Alongside each edge is a number representing the cost of the microstate changes for making the transition between the two nodes that the edge connects.

Figure 14:
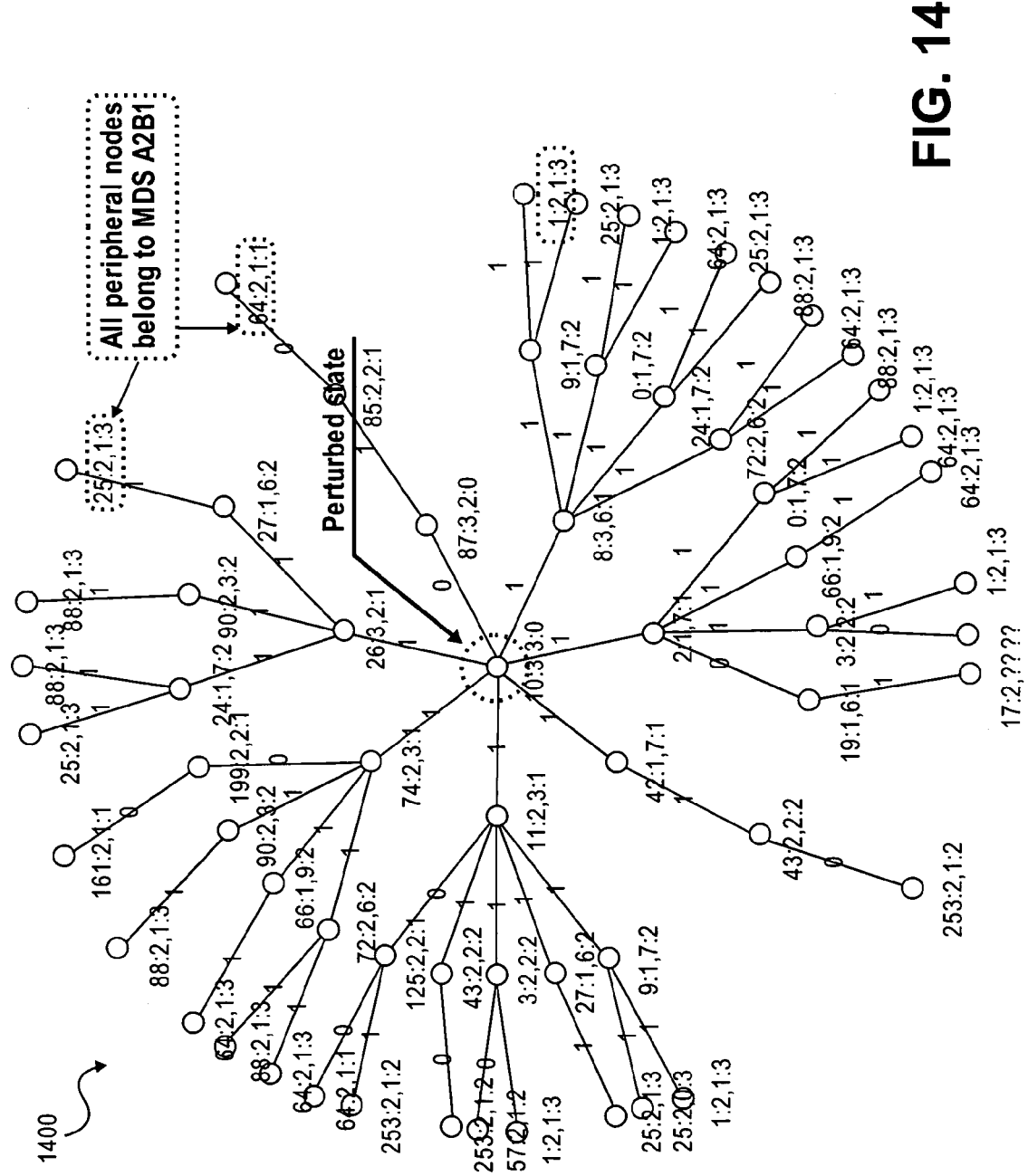
FIG. 14 is a diagram of an example self-heal graph (SHG) that is constructed from the example MMG of FIGS. 11 and 13, according to an embodiment of the invention.

FIG. 14 shows an SHG 1400 constructed from the MMG 1100 of FIG. 11, as the paths leading to the desired MDS have been highlighted in FIG. 13, according to an embodiment of the invention. Because the desired MDS is the MDS A2B1, all of the paths of the SHG 1400 lead to and end at the MDS A2B1, and start from the undesired MDS 1104, having the macrostate 10. The desired MDS A2B1 encompasses various macrostates; however, because of the DSI property, it does not matter which particular macrostate the system is caused to enter ultimately, so long as the macrostate is part of the desired MDS A2B1.

The SHG 1400 makes use of the cost associated with each microstate change. The edges of the SHG 1400 each carry a weight that is equal to the cost associate with each microstate change that is responsible for a change to the global dynamics of the computing system. The last number of each node label is further the cumulative cost of each microstate change on the path leading to that node, starting from the center node. Some edges have zero weights, which results from this state change occurring due to the normal dynamics of the system, and not due to any forced microstate change. The weight of each edge is determined by the cost function that has been described.

Figure 15:
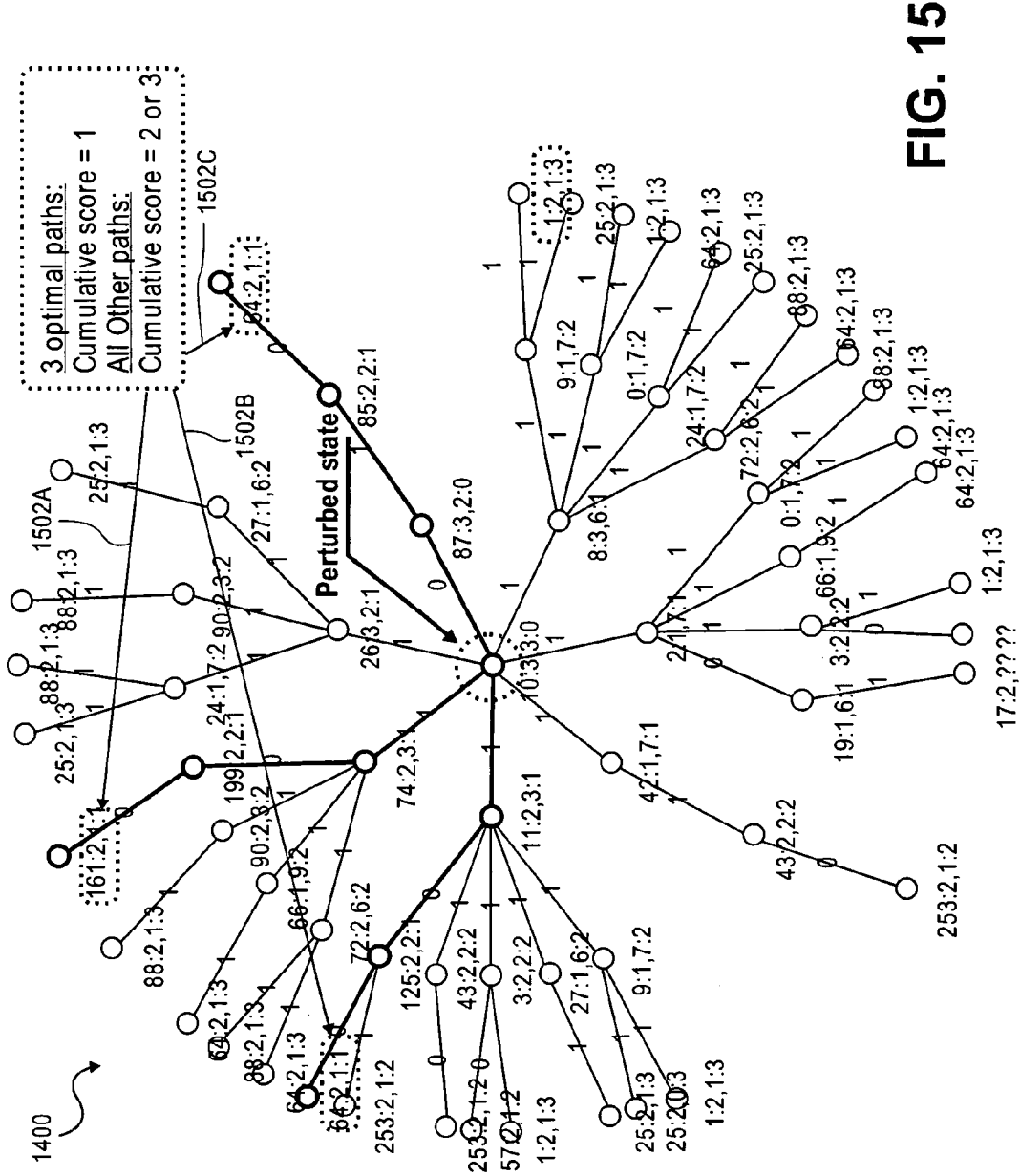
FIG. 15 is a diagram of the example SHG of FIG. 14 in which the optimal paths having the lowest associated costs are highlighted, according to an embodiment of the invention.

The action component 922 further prunes the SHG 1400 as well. In viewing the SHG 1400 in FIG. 14, it is apparent that not all paths from the center node to a peripheral node have the same cumulative cost. There are some paths having cumulative costs that are less than those of other paths. Therefore, this means that there are some paths that are more optimal for recovery of the system. This could be with respect to a small number of microstates that need to be forced to move the system along a path, a larger number of natural dynamics of the system contributing to recovery, or a combination of both. Therefore, the action component 922 determines all the paths with the least cost. For instance, FIG. 15 shows the SHG 1400 in which these optimal paths, having the lowest associated costs, are highlighted, according to an embodiment of the invention.

From these optimal paths of the SHG 1400 having the lowest associated costs, the action component 922 selects one of these paths as the path to force the system down to reach the desired MDS. This selected optimal path is the ultimate path that is employed to have the system self-heal and self-protect itself. Once the computing system reaches the desired MDS, the system has reached a desirable stable MDS. It is noted that, as depicted in FIGS. 14 and 15, the actual macrostate of the system may be either 16 or 64, but the actual macrostate of the system does not matter; rather, the MDS of the system being the desired stable MDS A2B1 is what matters.

Representative Method and System, and Conclusion

Figure 16:
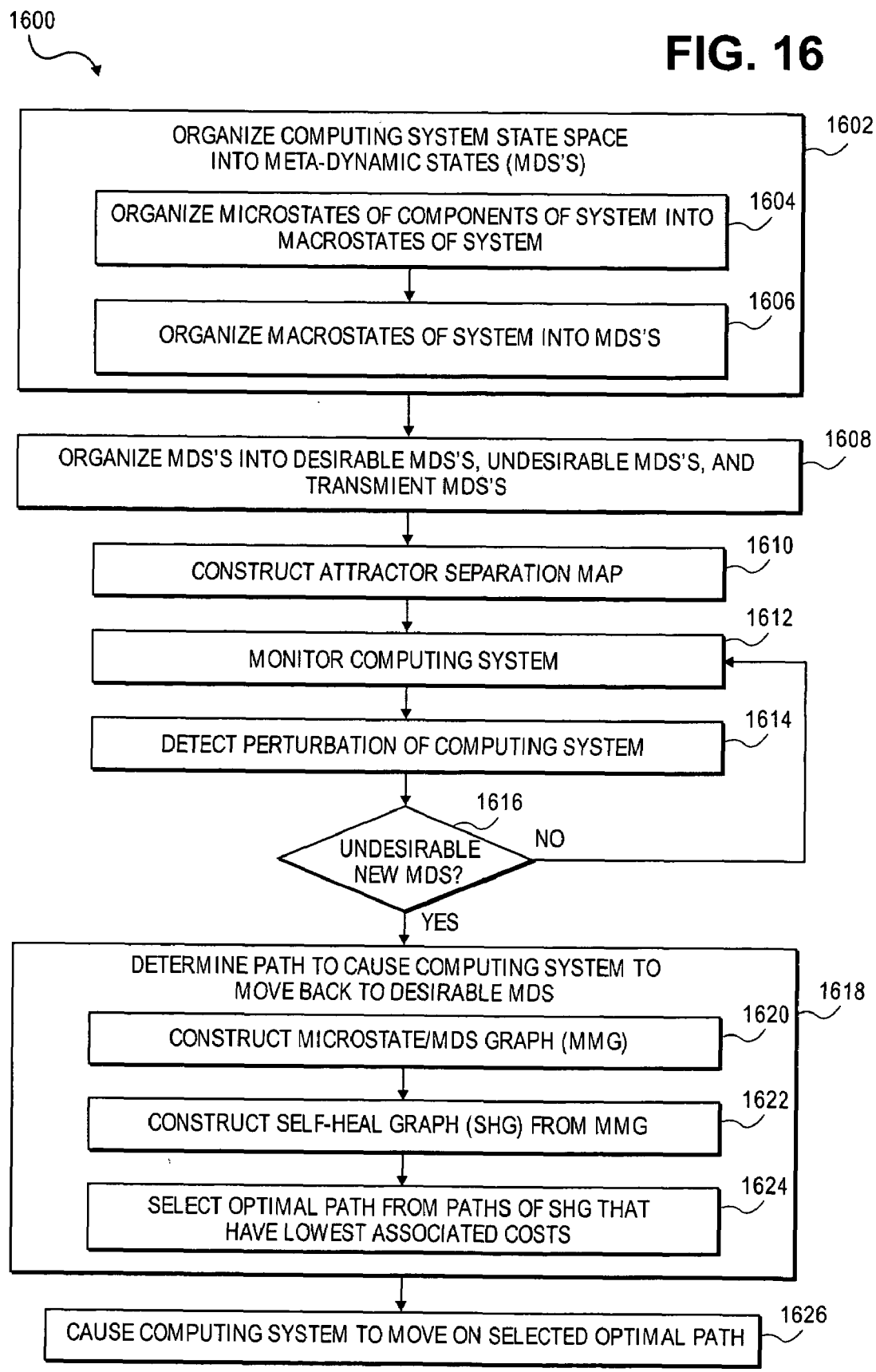
FIG. 16 shows a method in which a computing system is self-aware and self-healing, according to an embodiment of the invention.

FIG. 16 shows a method 1600 in which a computing system is self-aware and self-healing, according to an embodiment of the invention. The method 1600 encompasses the self-aware and self-healing aspects that have been described in previous sections of the detailed description, as well as the modeling of computing systems that have been described in the previous sections of the detailed description. The state space of the computing system is first organized into meta-dynamic states (MDS's) (1602). As has been described, this encompasses organizing the microstates of the components of the system into macrostates (1604), and then organizing the macrostates of the system into MDS's (1606).

The MDS's are then organized into desirable MDS's, undesirable MDS's, and transient MDS's (1608), so that when the system enters a given MDS, it is able to be self-aware and determine whether it has entered a desirable, undesirable, or a transient state leading to a desirable or an undesirable state. An attractor separation map may also be constructed (1610), as has been described, for analyzing the system. Thereafter, the computing system is monitored (1612), such that, for instance, it monitors itself. If a perturbation of the computing system is detected (1614), then it is determined whether the system is now in a desirable or an undesirable new MDS. If the system is in a desirable MDS (1616), then in one embodiment, no action is performed, and the self-awareness aspect of the computing system leads it to conclude that its new MDS is satisfactory, such that monitoring continues at 1612 as before.

However, if the computing system is in an undesirable MDS (1616), then the computing system, as part of self-healing or self-protection, determines a path to cause itself to move back to a desirable MDS (1618). This is accomplished by constructing a microstate/MDS graph (MMG) (1620), based on a number of parameters as has been described, and further constructing a self-heal graph (SHG) (1622) from a pruned version of the MMG in which just the paths that lead to a desired MDS remain. An optimal path of the SHG is selected as the path to cause the computing system to move to the desired MDS, from the paths of the SHG that have the lowest associated costs (1624), as has been described. Ultimately, then, the computing system is caused to move along the selected optimal path (1626) to reach the desired MDS, and thus effectuate self-healing and/or self-protection.

Figure 17:
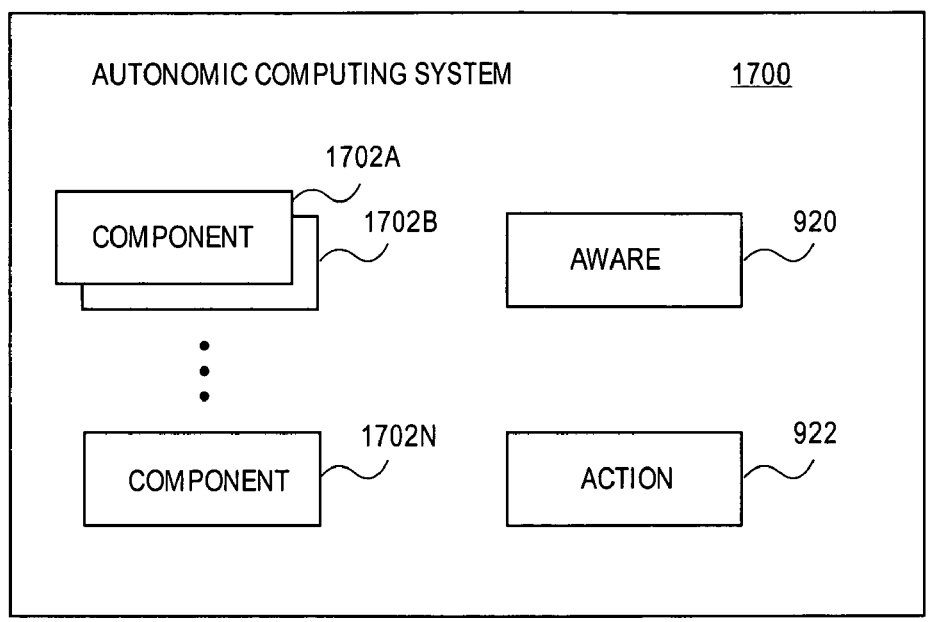
FIG. 17 shows a representative autonomic computing system, according to an embodiment of the invention.

FIG. 17 shows a representative autonomic computing system 1700, according to an embodiment of the invention. The computing system 1700 is depicted as including a number of components 1702A, 1702B, ..., 1702N, collectively referred to as the components 1702. The components 1702 are the components that have microstate changes, as have been described. The computing system 1700 also includes the aware component 920 and the action component 922 that have been described. Each of the components 1702, 920, and 922 may be software, hardware, or a combination of software and hardware. Furthermore, the computing system 1700 may have other components, in addition to and/or in lieu of those depicted in FIG. 17.

The aware component 920 monitors the computing system 1700 as a whole to detect perturbations of the computing system 1700 resulting in movement thereof to new MDS's, and then determines whether the new MDS's are desirable or undesirable. The action component 922 causes the computing system 1700 to move along paths to desired MDS's, where the aware component 920 has determined that the new MDS's are undesirable. Movement along these paths is accomplished by forcing microstate changes on one or more of the components 1702 at different time levels, as has been described.

It is noted that, although specific embodiments have been illustrated and described herein, it will be appreciated by those of ordinary skill in the art that any arrangement calculated to achieve the same purpose may be substituted for the specific embodiments shown. For example, in FIG. 17, the components 920 and 922 are depicted as being part of the same computing system 1700 as the components 1702. However, in a different embodiment, the computing system 1700 may be a target computing system having the components 1702, where the components 920 and 922 are part of a different, monitoring computing system that monitors and effects changes within the target computing system 1700. This application is thus intended to cover any adaptations or variations of embodiments of the present invention. Therefore, it is manifestly intended that this invention be limited only by the claims and equivalents thereof.

I claim:

1. A method comprising:
   organizing a computing system into a plurality of meta-dynamic states, the computing system having a plurality of components, each component having a plurality of microstates, the microstates of the components organized into a plurality of macrostates of the computing system, the macrostates organized into the meta-dynamic states;
   monitoring the computing system, such that perturbations of the computing system are detected;
   where a perturbation of the computing system will result in movement thereof to a new meta-dynamic state,
      determining whether the new meta-dynamic state is undesirable;
      where the new meta-dynamic state is undesirable,
         determining a path to cause the computing system to move back to a desirable meta-dynamic state; and,
         causing the computing system to move on the path to the desirable meta-dynamic state,
   wherein the macrostates are organized into attractors and basins of attraction, each attractor being a stable state in which the computing system is stable, and each basin of attraction being a transient state in which the computing system is unstable, but which leads to one of the attractors,
      said method further comprising constructing an attractor separation map indicating how the attractors are separated from one another by a plurality of hamming distances, each hamming distance being a number of bits that differ between two attractors.

2. A method comprising:
   organizing a computing system into a plurality of meta-dynamic states, the computing system having a plurality of components, each component having a plurality of microstates, the microstates of the components organized into a plurality of macrostates of the computing system, the macrostates organized into the meta-dynamic states;
   monitoring the computing system, such that perturbations of the computing system are detected;
   where a perturbation of the computing system will result in movement thereof to a new meta-dynamic state,
      determining whether the new meta-dynamic state is undesirable;
      where the new meta-dynamic state is undesirable,
         determining a path to cause the computing system to move back to a desirable meta-dynamic state; and,
         causing the computing system to move on the path to the desirable meta-dynamic state,
   wherein determining a path to cause the computing system to move back to a desirable meta-dynamic state comprises: constructing a microstate/meta-dynamic state graph that depicts which of the meta-dynamic states the computing system enters when one or more of the microstates are changed according to one or more parameters,
   wherein construction of the microstate/meta-dynamic state graph is completed when the desirable meta-dynamic state has been reached from the new meta-dynamic state that is undesirable,
   wherein the one or more parameters comprise:
      a maximum number of components that the computing system is able to force a microstate change on at the same time;
      a cost associated with each microstate change that the computing system is able to force;
      a time limit for how long movement of the computing system to the desirable meta-dynamic state from the new meta-dynamic state that is undesirable is able to maximally take; and,
      a desired meta-dynamic state that is the desirable meta-dynamic state to which the computing system is to move.

3. A method comprising:
   organizing a computing system into a plurality of meta-dynamic states, the computing system having a plurality of components, each component having a plurality of microstates, the microstates of the components organized into a plurality of macrostates of the computing system, the macrostates organized into the meta-dynamic states;
   monitoring the computing system, such that perturbations of the computing system are detected;
   where a perturbation of the computing system will result in movement thereof to a new meta-dynamic state,
      determining whether the new meta-dynamic state is undesirable;
      where the new meta-dynamic state is undesirable,
         determining a path to cause the computing system to move back to a desirable meta-dynamic state; and,
         causing the computing system to move on the path to the desirable meta-dynamic state,
   wherein determining a path to cause the computing system to move back to a desirable meta-dynamic state comprises: constructing a microstate/meta-dynamic state graph that depicts which of the meta-dynamic states the computing system enters when one or more of the microstates are changed according to one or more parameters, wherein construction of the microstate/meta-dynamic state graph is completed when the desirable meta-dynamic state has been reached from the new meta-dynamic state that is undesirable, wherein determining a path to cause the computing system to move back to a desirable meta-dynamic state further comprises: construing a self-heal graph from the microstate/meta-dynamic state graph, such that the new meta-dynamic state that is undesirable is at a center of the self-heal graph, and the desirable meta-dynamic state is at a periphery of the self-heal graph, wherein the self-heal graph comprises a plurality of paths from the new meta-dynamic state that is undesirable to the desirable meta-dynamic state, each path having an associated cost that is incurred for the computing system to move along the path from the new meta-dynamic state that is undesirable to the desirable meta-dynamic state, wherein determining a path to cause the computing system to move back to a desirable meta-dynamic state further comprises: selecting an optimal path from the paths from the meta-dynamic state that is undesirable to the desirable meta-dynamic state that have lowest associated costs, wherein the optimal path is the path that the computing system is caused to move on to the desirable meta-dynamic state.

* * * * *